July 20, 1965 M. DENENBERG 3,195,771
ARTICLE CARRIER
Filed May 1, 1962 2 Sheets-Sheet 1
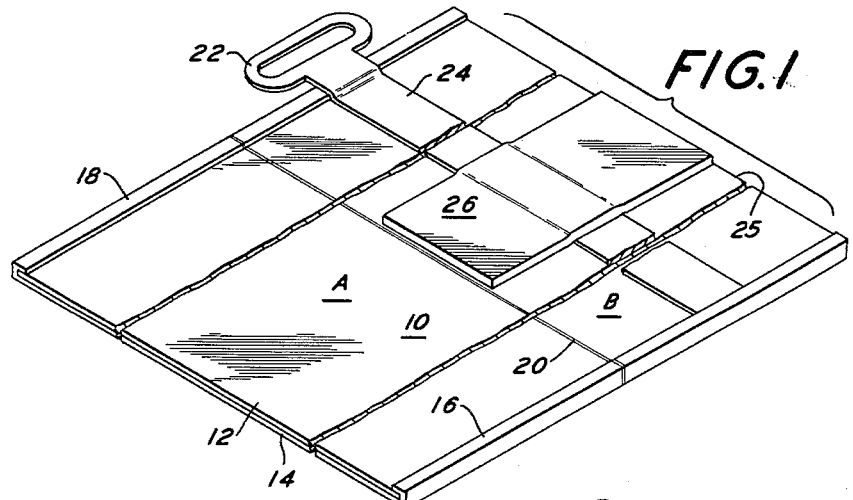
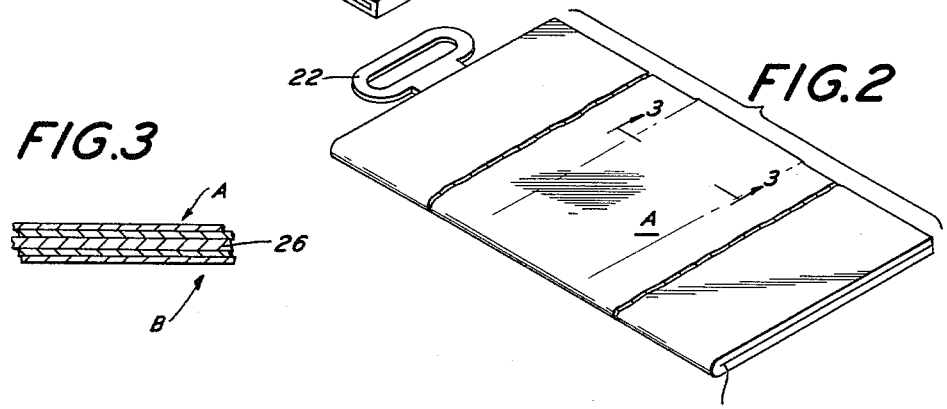
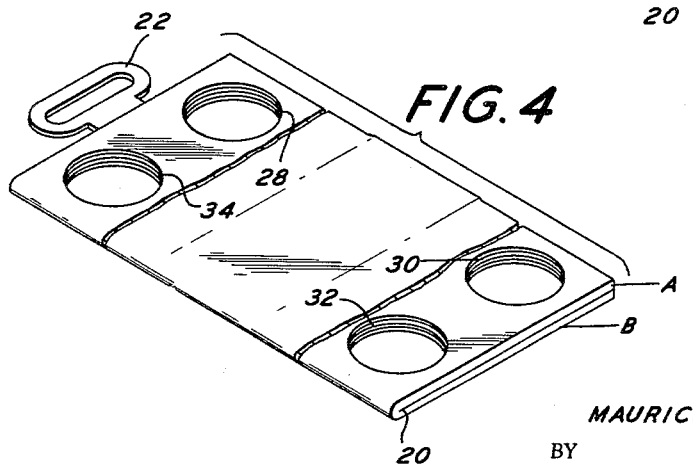
INVENTOR.
MAURICE DENENBERG
BY
Arthur H Seidel
ATTORNEY July 20, 1965   M. DENENBERG   3,195,771
ARTICLE CARRIER
Filed May 1, 1962   2 Sheets-Sheet 2
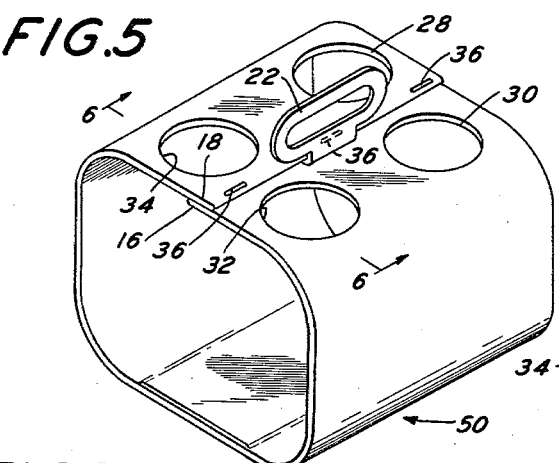
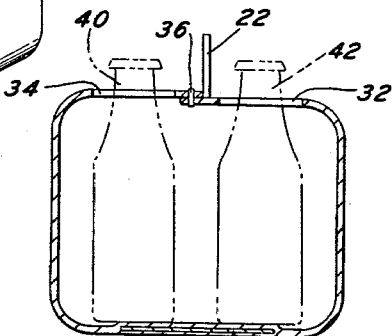
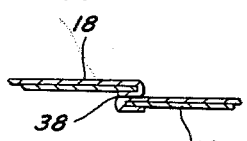
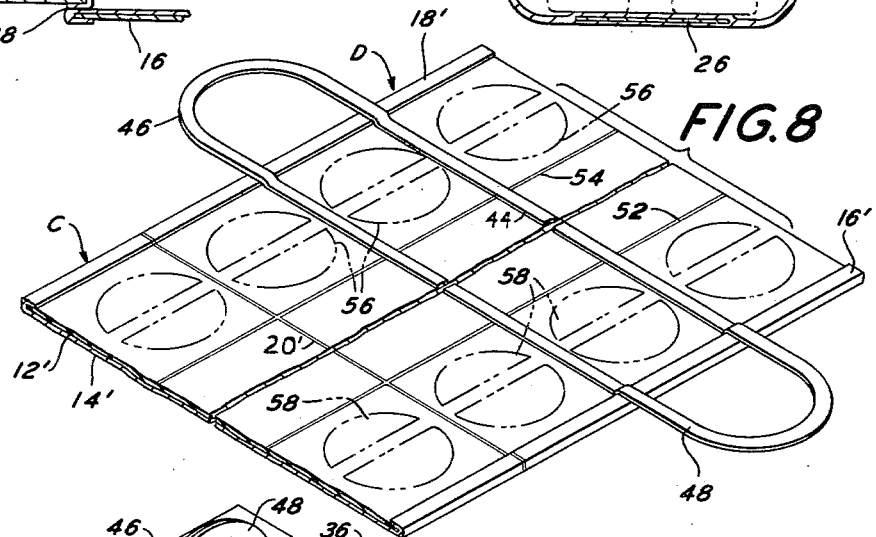
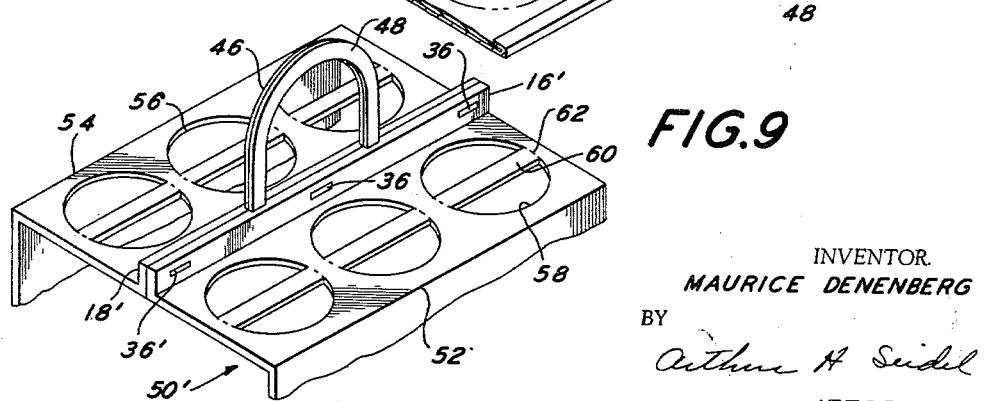
INVENTOR.
MAURICE DENENBERG
BY
Arthur H. Seidel
ATTORNEY

United States Patent Office 3,195,771
Patented July 20, 1965

3,195,771
ARTICLE CARRIER
Maurice Denenberg, 468 Wyngate Road, Wynnewood, Pa.
Filed May 1, 1962, Ser. No. 191,576
11 Claims. (Cl. 220—116)

This invention relates to a carrier and the method for making the same. More particularly, the present invention is directed to a carrier of the type designed primarily to carry articles such as bottles of soda and a novel method for manufacturing the same.

The carrier of the present invention is designed primarily for carrying bottles or other containers in a manner so that the bottles are spaced from each other and disposed in an upright position. The carrier of the present invention is made from a one piece blank having a reinforcement bottom layer and a discrete handle. As will be made clear hereinafter, the carrier of the present invention is open at each end thereof.

The carrier of the present invention is constructed from a laminated blank which is folded over on itself during the method for constructing the same. I have found that the use of laminated materials materially decreases the weight of the carrier of the present invention while at the same time providing a carrier which is as strong as those proposed heretofore. Heretofore, carriers have been made from lightweight cardboard and are constructed in a manner requiring complicated machinery. Also, the blanks utilized in making carriers heretofore result in a substantial amount of waste due to the requirement of making cut-out tabs, etc.

In the method of the present invention, one starts with an endless sheet of laminated material. The endless sheet of laminated material may be fed through a folder which bends the side edges of the laminated sheet over on itself so as to provide overlapped side edge portions. Thereafter, the endless sheet is cut into lengths of laminated sheets. The laminated sheets are then provided with a score line across a central portion thereof and folded on itself along the score line.

Prior to the folding operation, a handle will be provided so that the handle extends substantially parallel to the score line and a reinforcement bottom plate will be provided so that it extends substantially perpendicular to the score line. The two halves of the sheet will be adhesively or otherwise secured together with the handle and reinforcement plate therebetween.

The next step in the method of the present invention involves the punching or die cutting of holes in the thusly formed blank. Thereafter, the side edge portions of the sheet are secured together in any convenient manner, thereby completing the carrier. The carrier of the present invention may be shipped in a flat state to the location where it is to be used. At such location, the carrier is assembled by simply interconnecting the side edge portions thereof. The ease with which the carrier is completed at the location where it is to be used together with the lack of the necessity for specialized equipment to accomplish this operation is a distinct advantage of the present invention over the prior art.

It is an object of the present invention to provide a novel article carrier.

It is another object of the present invention to provide a novel article carrier which may be shipped in a flat state and easily assembled without the requirement of expensive or complicated assembling equipment.

It is another object of the present invention to provide a novel article carrier which is made from laminated sheets so as to be lighter in weight than those proposed heretofore.

It is another object of the present invention to provide a novel method for making article carriers.

It is another object of the present invention to provide a novel method for making article carriers without utilizing expensive or complicated equipment.

It is still another object of the present invention to provide a novel method for making article carriers which are lighter and cheaper than those proposed heretofore.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of a laminated sheet at an intermediate stage of the method of constructing a carrier in accordance with the present invention.

FIGURE 2 is a perspective view of the sheet in FIGURE 1 at a later stage of constructing the carrier of the present invention.

FIGURE 3 is a view taken along the lines 3—3 in FIGURE 2.

FIGURE 4 is a perspective view of the laminated sheet at a later stage in the constructing of the carrier of the present invention.

FIGURE 5 is a perspective view of an assembled carrier in accordance with the present invention.

FIGURE 6 is a sectional view taken along the lines 6—6 in FIGURE 5.

FIGURE 7 is a sectional view of the overlapping joint between side edge portions of a laminated sheet in accordance with another embodiment of the present invention.

FIGURE 8 is a partial perspective view of a laminated sheet in accordance with still another embodiment of the present invention.

FIGURE 9 is a partial pespective view of a carrier made in accordance with the sheet illustrated in FIGURE 8.

Referring to the drawings in detail, wherein like numerals indicate like elements, there is shown in FIGURE 1 a laminated sheet 10.

In accordance with well known procedures, two sheets 12 and 14 will be laminated together to form a endless strip from which sheet 10 has been cut. Prior to cutting the endless strip into discrete sheets 10, the endless strip will pass through a folding apparatus which will fold the side edge portions 16 and 18 inwardly so as to overlap layer 12. Preferably, an adhesive or the like will be applied to the edge portions so that the edge portions 16 and 18 are adhesively secured to the layer 12.

Each sheet 10 is provided with a score line 20 extending transversely thereacross. The score line 20 may be provided after the sheet 10 has been cut from the endless strip. Alternatively, the endless strip may pass through a set of rollers which automatically provide a score line thereacross at spaced points therealong. The provision of a score line 20 divides the laminated sheet 10 into halves A and B. By any suitable means, mechanical or manual, a band of adhesive or the like will be applied transversely across the central portion of the half B in a manner so as to be substantially parallel to the score line 20. Thereafter, a handle 22 having an extension strip 24 will be placed over the band of adhesive, thereby causing the extension strip 24 to be adhesively secured to the half B. The extension strip 24 may be cardboard, knitted material, mesh material, etc., which is capable of being bent as will be made clear hereinafter.

The next step in the method of the present invention is to apply a wide band of adhesive to the half B, with such band extending from a point adjacent the score line 20 to a point adjacent the end 25. Thereafter, a reinforcement bottom plate 26 is placed over the last mentioned band of adhesive so that the plate 26 is bonded to the half B and the extension strip 24. The plate 26 is preferably made from a rigid material such as cardboard, plastic, chipboard, hard cardboard, etc.

The layers 12 and 14 of the laminated sheet 10 are preferably diverse materials. The layer 12, for example, may be a layer of kraft paper or the like. The layer 14 is preferably an imperforate impervious material such as a thin layer of Mylar, nylon, aluminum foil, etc. The next step in constructing the carrier of the present invention is to fold half A over half B as illustrated more clearly in FIGURE 2. This folding operation may be accomplished by any convenient means, mechanical or manual. Numerous types of folding devices are commercially available and are readily adaptable for accompilshing the folding operation. Prior to such folding operation, half A will be coated with an adhesive or the like. Preferably, the last mentioned adhesive will be a waterproof adhesive.

Hence, the thusly constructed blanks as illustrated in FIGURE 2 will have the haves A and B overlapping and adhesively scured together with the strip 24 and plate 26 sandwiched therebetween. As illustrated more clearly in FIGURE 3, the plate 26 may be of greater thickness than the combined thickness of the layers 12 and 14. By way of example, the combined thickness of the layers 12 and 14 may be approximately .020 inch whereas the thickness of the plate 26 may be .060 inch thick.

The next step in constructing the carrier of the present invention is to punch or die cut spaced holes 28, 30, 32 and 34 as illustrated more clearly in FIGURE 4. It will be noted that the holes 28–34 extend through the halves A and B and are closer to the side edges thereof than the plate 26. The carrier blank as it exists in FIGURE 4 may may be shipped directly to the consumer. With the blank in this flat condition, a material saving in shipping space is obtained. In order to assemble the blank illustrated in FIGURE 4 so as to construct a carrier designated generally as 50 and illustrated in FIGURE 5, it is only necessary to overlap the side edge portions 16 and 18 and secure the same. Securement of the side edge portions may be accomplished in any one of a variety of manners without utilizing expensive or complicated equipment. For example, the side edge portions 16 and 18 may be secured together by means of staples 36. Alternatively, the side edge portions 16 and 18 may be secured together by an epoxy resin 38 which is applied in a heated state and permitted to cool, see FIGURE 7.

The carrier 50, as illustrated in FIGURES 5 and 6, results in the provision of a relationship whereby the holes 28, 30, 32 and 34 are above the plate 26. Hence, liquid containers such as bottles 40 and 42 may be placed in the carrier with the bottom surfaces of the bottles being supported by the plate 26. Since the layer 14 is a water impervious material, the carrier 50 will have a longer life span than the cardboard carriers proposed heretofore. In this regard, it will be noted that the inner and outer surfaces of the carrier 50 are formed from the layer 14. If desired, the portion of the layer 14 on half B may be imprinted with advertising material or the like. If printing material is desired on this portion of layer 14, it may be provided while the layer 14 was part of the endless strip or while the blank is in the form illustrated in FIGURES 2 or 4.

The carrier 50 will be lighter than those proposed heretofore and yet will be stronger than those proposed heretofore. At the same time, the carrier 50 will have a longer life since the inner and outer surfaces thereof are waterproof. The carrier 50 may be manufactured more economically than those proposed heretofore since the necessity for expensive or complicated equipment is obviated. The carrier 50 may be carried by means of the handle 22 which is connected to each of the halves A and B by means of its extension strip 24. While only four article receiving holes are provided in the carrier 50, it will be appreciated that a greater or lesser number may be provided as desired.

In FIGURES 8 and 9, there is disclosed another embodiment of the present invention. In FIGURE 8, there is disclosed a sheet 10' having halves C and D. The sheet 10' may be made from the identical materials utilized in sheet 10 and may be cut from an endless strip as described above. Hence, the sheet 10' may be provided with side edge portions 16' and 18'.

The sheet 10' may be provided with a transversely extending score line 20' in a central portion thereof and longitudinally extending score lines 52 and 54. A handle may be provided in the form of an endless loop 44 having end portions 46 and 48. The endless loop 44 may be made from a fabric, wire, plastic, etc. The portions of the loop 44 extending across the half D will be adhesively secured thereto in the manner described above. Thereafter, a bottom plate will be applied in the manner described above. At this point, the halves C and D will be folded so as to overlap each other thereby obtaining a resultant blank similar to that disclosed in FIGURE 2.

With the blank in this stage, a plurality of spaced holes 56 will be punched or die cut in that portion of the blank between score line 54 and side edge 18'. Also, a plurality of holes 58 may be simultaneously provided in that portion of the blank between score line 52 and side edge 18'. These holes are illustrated in phantom in FIGURE 8 since they will be provided through both of the halves C and D.

In providing the holes 56 and 58, a central bridge such as bridge 60, see FIGURE 9, may be provided. The ends of the bridges 60 are integral with the blank and perforations 62 may be provided to facilitate ready removal of the bridge when desired.

When the blank 10' is assembled into a carrier 50' as illustrated in FIGURE 9, it will be noted that the carrier has top walls which are substantially parallel to the bottom walls as a result of folding the blank along the score lines 52 and 54. The side edge portions 16 and 18 may be in overlapping relation and secured together in any convenient manner such as by adhesive or by staples 36'. The ends 46 and 48 of the loop 44 will be juxtaposed to each other thereby forming a handle. The carrier 50' is more readily adaptable for use with cans such as cans of beer, soda, etc. Each of the carriers 50 and 50' will be open at opposite ends.

Preferably the articles to be carried, such as cans, will be placed on top of a blank 10' and then the blank will be folded over the articles so that the side edge portions 16' and 18' may be secured together. When it is desired to remove one of the articles, the bridge 60 thereabove may be easily torn away so as to expose that article. To facilitate ready removal of the desired article, the hole 56 or 58 will have a transverse dimension which is slightly larger than the transverse dimensions of the article. Due to the tightness with which the blank 10' is applied around the articles, the articles will not readily fall out through the open ends of the carrier 50'. Since the endless loop 44 is made from a readily flexible material such as fabric, one carrier 50' may be readily stacked on top of another carrier 50'.

Thus, it will be seen that I have provided a novel carrier and method for making the same which is simpler, cheaper, and easier than those proposed heretofore.

The present invention may be embodied in other specific forms without departing from the spirit or essential attributes thereof and, accordingly, reference should be made to the appended claims, rather than to the foregoing specification as indicating the scope of the invention.

I claim:

1. A carrier comprising a one piece body made from a lightweight laminated material, said body being tubular and having open ends, means securing side edge portions of said body together in overlapping relation, a reinforced bottom plate between layers of said laminated material, said body having holes therethrough on opposite sides of said overlapped side edge portions, said holes being above said bottom plate, the axis of said holes being substantially perpendicular to the plane of said bottom plate, a handle adjacent said side edge portions, and said handle having an extension portion extending between and secured to layers of said laminated material.

2. A carrier in accordance with claim 1 wherein said laminated material includes a waterproof outer layer, said body being made from a sheet folded over on itself so that said waterproof layer is on the inner and outer surfaces of said body.

3. A carrier in accordance with claim 2 wherein said waterproof layer is aluminum foil, whereby said body is capable of reflecting heat.

4. A carrier in accordance with claim 1 including a bridge integral with said body, said bridge extending across each hole, said body being perforated at at least one end of each bridge.

5. A carrier in accordance with claim 1 including a score line on opposite sides of said overlapping edge portions, said body being folded along said score lines.

6. A carrier in accordance with claim 1 wherein said handle is one end of an endless loop.

7. A carrier in accordance with claim 1 wherein said means securing said edge portions together in overlapping relation includes metal staples.

8. A carrier in accordance with claim 1 wherein said means securing said edge portions in overlapping relation includes an epoxy resin between said edge portions.

9. A carrier blank comprising a one piece body, said body being made from laminations of layers of non-porous material and paper, said body being folded in half so that the two halves are juxtaposed to each other with the non-porous material being on the upper and lower surface of said body, adhesive between said halves, a handle, said handle having an extension disposed between and secured to said halves, and said body having spaced holes extending therethrough adjacent side edges thereof.

10. A blank in accordance with claim 9 including a rigid reinforcement plate disposed between said halves and adhesively secured thereto, said reinforcement plate having side edges substantially parallel to side edges of said blank, and the side edges of said plate being spaced from said holes.

11. A carrier blank comprising a one piece body, said body being made from laminations of layers of non-porous material and paper, said body being folded in half so that the two halves are juxtaposed to each other with the non-porous material being on the upper and lower surface of said body, adhesive between said halves, a handle, said handle having an extension disposed between and secured to said halves, and a rigid reinforcement plate disposed between said halves and adhesively secured thereto, said reinforcement plate having side edges substantially parallel to side edges of said blank.

References Cited by the Examiner
UNITED STATES PATENTS

| | | | |
|---|---|---|---|
| 1,236,589 | 8/17 | Miller. | |
| 2,245,675 | 6/41 | Hultin | 229—3 |
| 2,396,473 | 3/46 | Powell | 220—112 |
| 2,473,429 | 6/49 | Hinman | 220—113 |
| 2,596,533 | 5/52 | Cottrel | 220—113 |
| 2,783,690 | 3/57 | Crary et al. | 93—1 |
| 2,805,791 | 9/57 | Arneson | 220—112 |
| 2,955,739 | 10/60 | Collura | 229—52 |
| 2,998,181 | 8/61 | Chasolen | 229—52 |

FRANKLIN T. GARRETT, *Primary Examiner.*
GEORGE O. RALSTON, *Examiner.*